No. 746,921. PATENTED DEC. 15, 1903.
E. P. CALDWELL.
FEED WATER PURIFIER.
APPLICATION FILED MAR. 4, 1903.
NO MODEL. 4 SHEETS—SHEET 3.
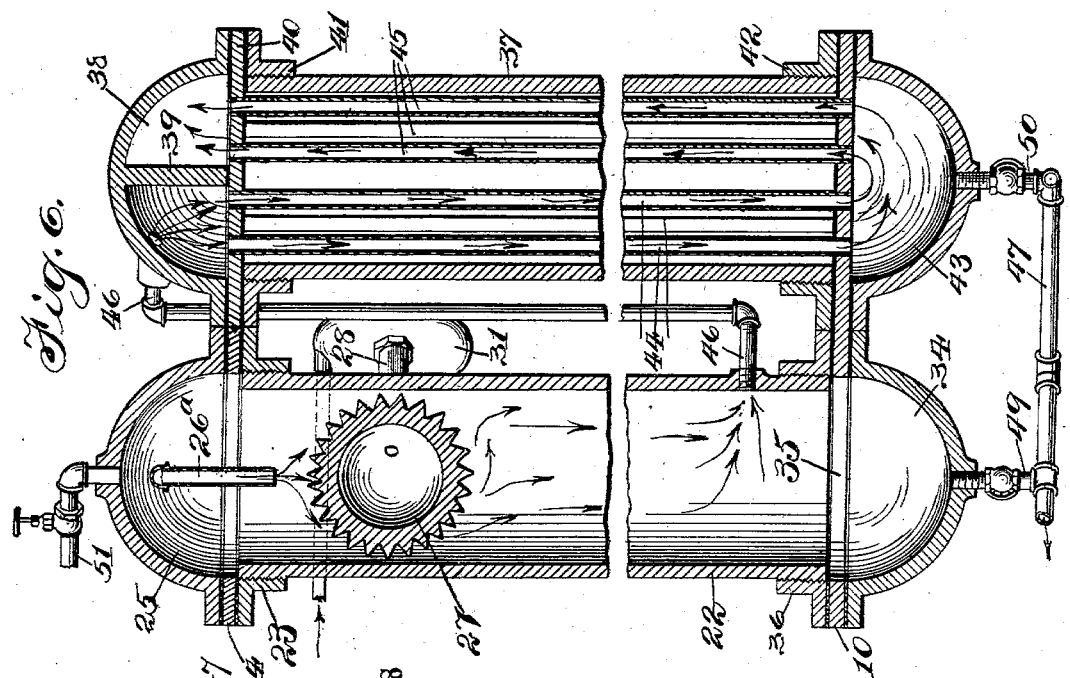
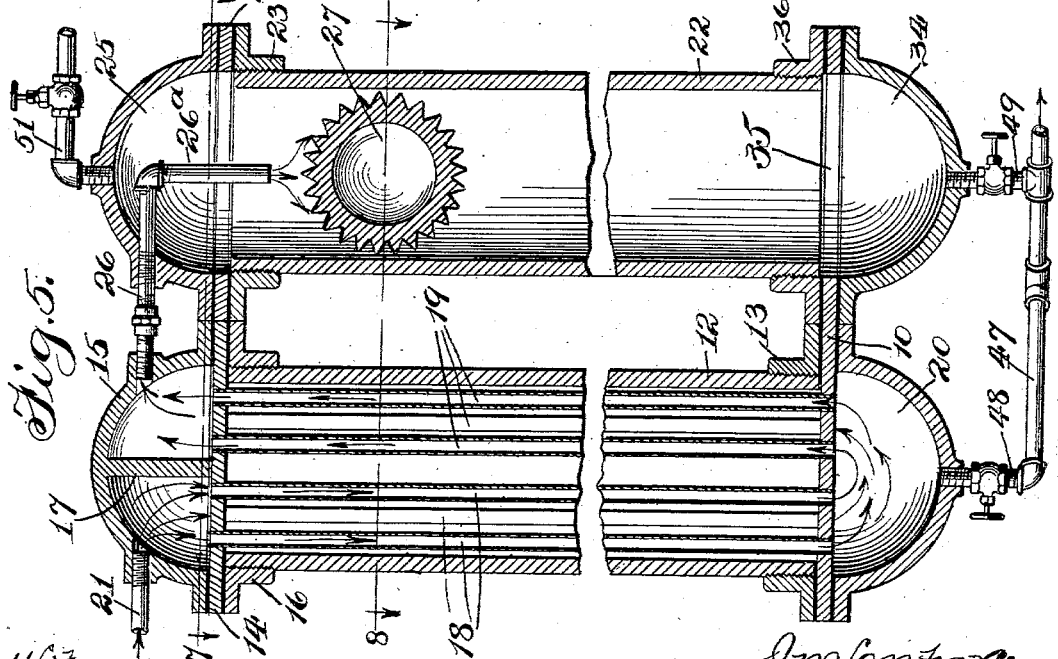

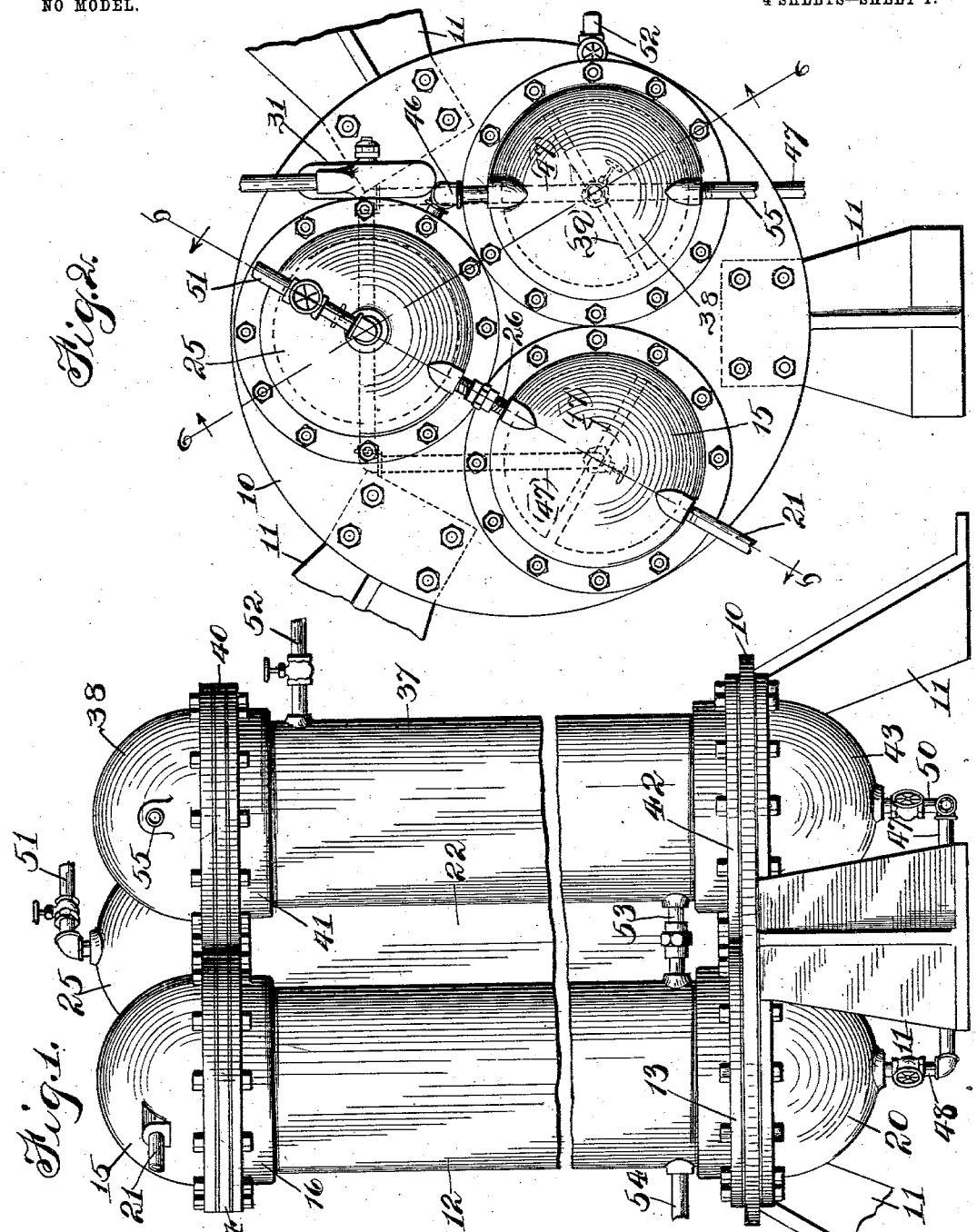

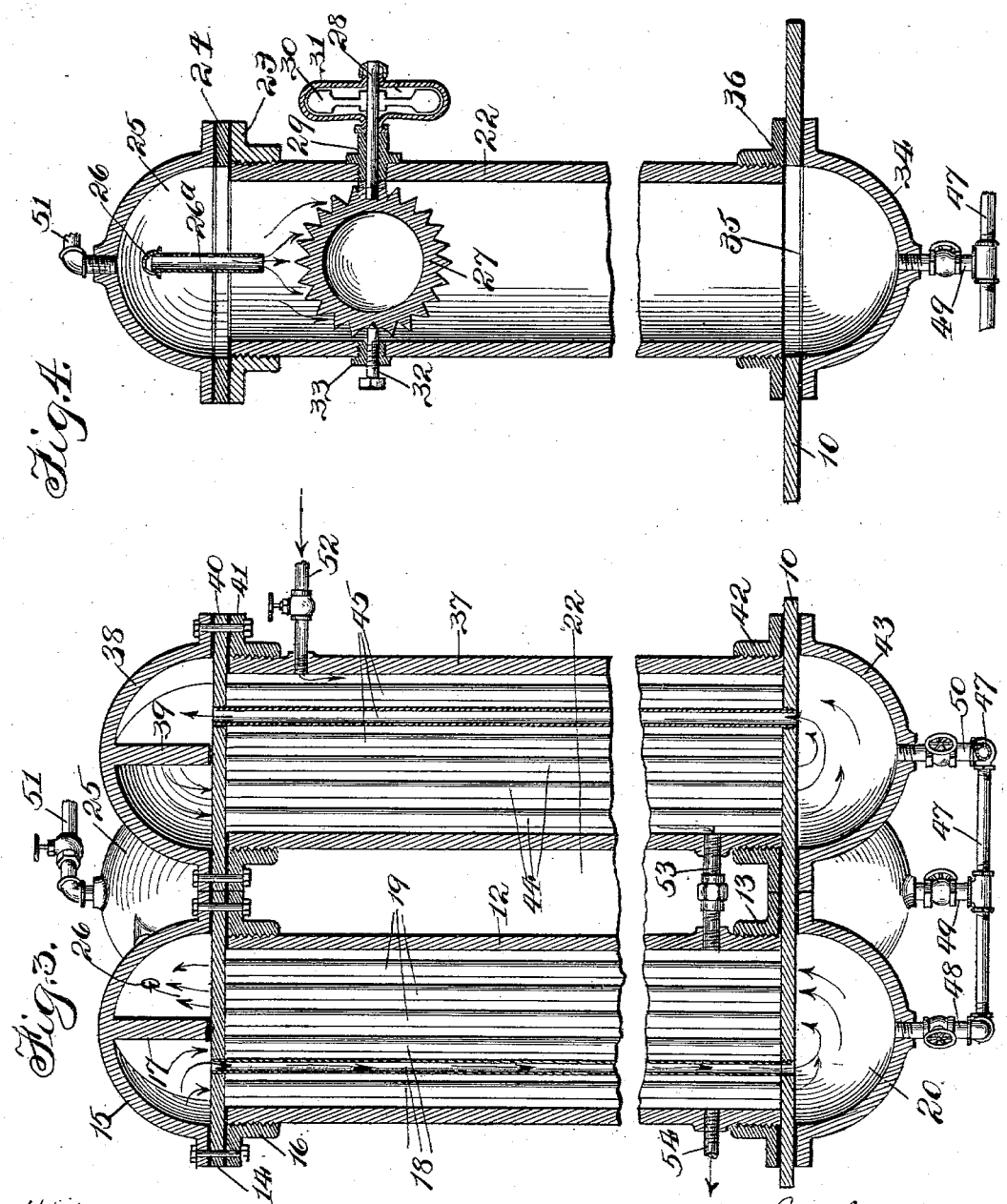

No. 746,921. PATENTED DEC. 15, 1903.
E. P. CALDWELL.
FEED WATER PURIFIER.
APPLICATION FILED MAR. 4, 1903.
NO MODEL. 4 SHEETS—SHEET 4.
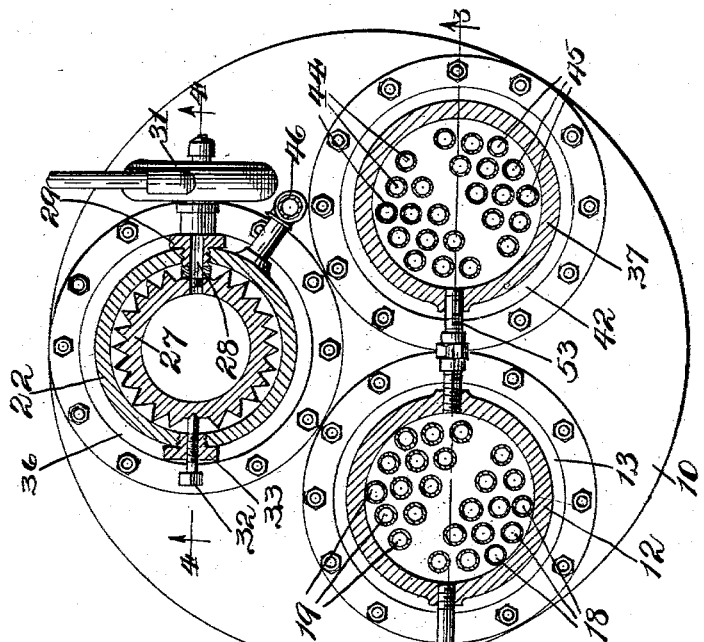
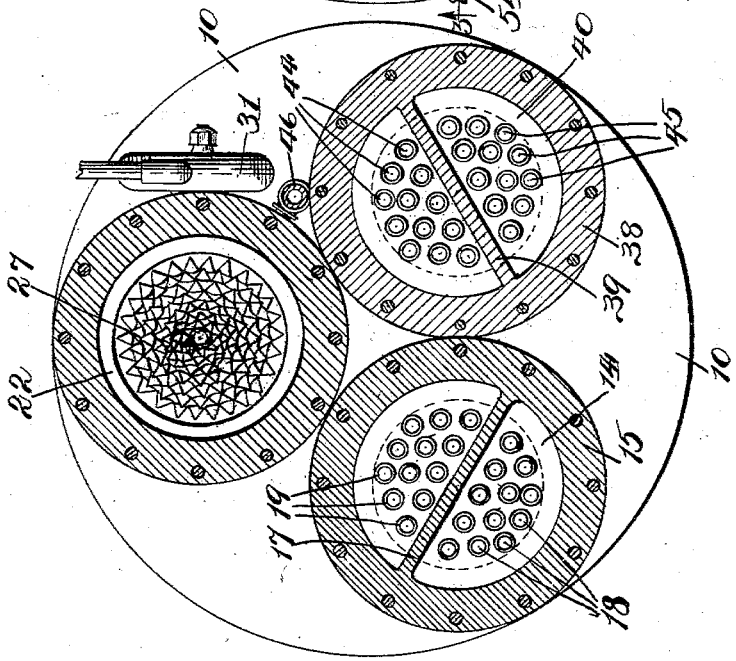
Witnesses: Inventor No. 746,921. Patented December 15, 1903.

UNITED STATES PATENT OFFICE.

EDWARD P. CALDWELL, OF CHICAGO, ILLINOIS, ASSIGNOR TO CENTRIFUGAL FEED WATER SEPARATOR AND PURIFIER COMPANY, OF CHICAGO, ILLINOIS, AND REDFIELD, SOUTH DAKOTA, A CORPORATION OF SOUTH DAKOTA.

FEED-WATER PURIFIER.

SPECIFICATION forming part of Letters Patent No. 746,921, dated December 15, 1903.

Application filed March 4, 1903. Serial No. 146,236. (No model.)

*To all whom it may concern:*

Be it known that I, EDWARD P. CALDWELL, a citizen of the United States, residing at Chicago, in the county of Cook and State of Illinois, have invented certain new and useful Improvements in Feed-Water Purifiers, of which the following is a specification, reference being had to the accompanying drawings.

My invention relates to mechanism for purifying water designed for boiler use, to the extent of removing from the water practically all of the matter that if admitted to the boiler would tend to incrust the walls and flues of the boiler with scale. I accomplish this object by the means shown in the drawings and hereinafter described. In brief, by my improvements the water is first passed through a series of tubes located in a closed vessel, around which tubes live steam is admitted, thus heating the water in such tubes to quite a high degree, after which the water is conducted to another vessel, in which its temperature is materially lowered and in which it is subjected to the action of a very rapidly-revolving separator that tends to throw off the scaling properties in the water, after which the water is passed through a third chamber of substantially the same construction as the one first mentioned, where it is again heated as it was in said first-mentioned chamber, and from thence forced to the boiler. Each of the three vessels mentioned is provided with a receptacle at its lower end adapted to receive the foreign matter separated from the water.

The particular construction and operation of the devices will be particularly hereinafter described.

That which I regard as new is set forth in the claims.

In the accompanying drawings, Figure 1 is a side elevation. Fig. 2 is a plan view. Fig. 3 is a vertical section taken at line 3 3 of Fig. 8. Fig. 4 is also a vertical section taken at line 4 4 of Fig. 8. Fig. 5 is a vertical section taken at line 5 5 of Fig. 2. Fig. 6 is a vertical section taken at line 6 6 of Fig. 2. Fig. 7 is a horizontal section taken through all three of the vessels shown in Fig. 1, such section being at line 7 7 of Fig. 5; and Fig. 8 is a view similar to Fig. 7, but taken at line 8 8 of Fig. 5.

Referring to the drawings, 10 indicates a base-plate, to which are secured supporting legs or standards 11 11.

12 indicates a vessel which in the construction shown is cylindrical in form and its open lower end rests upon the base-plate 10, to which it is secured, as shown in the drawings, by a flanged ring 13, which is screw-threaded to the lower end of said vessel 12, said flanged ring being securely bolted to the base-plate 10, as shown in Figs. 1 and 8.

14 indicates a plate covering the upper end of the vessel 12, upon which plate rests a dome 15, that is flanged at its lower end.

16 indicates a ring screw-threaded onto the upper end of the vessel 12, said ring being similar to the ring 13 at the lower end. This ring 16, the plate 14, and the dome 15 are secured together by bolts, as clearly shown in Fig. 1.

17 indicates a vertical wall, preferably formed with the dome 15 and dividing it centrally.

18 indicates a series of tubes in the vessel 12, each of the tubes of the series being secured at its ends in openings in the base-plate 10 and upper plate 14, as clearly shown.

19 indicates another series of tubes secured within the vessel 12 in the same manner as the tubes 18, but opening into the dome 15 on the opposite side of the vertical division-wall 17 in such dome.

20 indicates a settling-chamber at the lower end of the vessel 12, which is of substantially the same form as the dome 15, but not provided with a division-wall, as is such dome. This settling-chamber has a lateral flange at its upper end, which rests against the under face of the plate 10 and is held thereto by the bolts heretofore referred to that pass through such base-plate and the horizontal portion of the ring 13. As heretofore stated, these bolts and the bolts at the upper end that secure the dome 15 in place are clearly shown in Fig. 1, but are omitted in most of the other figures.

21 indicates a pipe communicating at one end with the dome 15, through which pipe the water to be purified enters the vessel 12, the point of entrance of such pipe to the dome being at that side of the vertical division-wall 17 to cause the water entering to pass down the tubes 18, such division-wall 17, as will be readily understood, preventing any such water from passing into the open upper ends of the tubes 19.

22 indicates another vessel, also cylindrical in form, and in the construction shown of the same size and shape as the vessel 12, which vessel I denominate the "cooling" vessel, as the water while in such vessel is not subjected to any heating, as it is in the vessel 12, the method of heating the water in the vessel 12 being hereinafter described.

23 indicates a ring screw-threaded onto the upper end of the vessel 12, said ring being flanged to support another ring 24, upon which rests the flanged portion of a dome 25. Said dome 25 is shaped like the dome 15, but is not provided with a vertical division-wall, as is the dome 15. The parts 23, 24, and 25 are firmly bolted together, as clearly shown in Fig. 1.

26 indicates a pipe communicating at one end with that portion of the dome 15 over the tubes 19 and having its other end passed through a suitable opening in the dome 25. The pipe 26 is provided, as shown, with a vertically-depending portion 26ª.

27 indicates a separator which in the form of construction shown is spherical (see Fig. 7) and provided with a large number of teeth or points. This spherical separator in the form of construction shown is of a diameter but slightly less than the interior diameter of the vessel 22, and by reason of its being made of this size practically no water issuing from the vertically-depending pipe 26ª escapes being acted upon by such separator. This separator is suitably secured to the squared inner end of a shaft 28, that passes through a stuffing-box 29 in the wall of the vessel 22, such shaft being that on which is secured a suitable water-motor 30 of any approved construction, the casing of the motor being indicated by 31. Projecting through the wall of the vessel 12 and in line with the shaft 28 is a set-screw 32, that passes through a suitable stuffing-box 33, the point of said set-screw entering a suitable socket in the face of the separator 27 and serving as a pivot on which such separator turns. By means of this arrangement wear and tear and inequality of fit can be at any time compensated for by properly turning the set-screw.

34 indicates another settling-chamber similar in all respects to the settling-chamber 20 and located below the vessel 22. The flanged edge of such settling-chamber 34 rests against the under face of the plate 10, around a large opening 35 in said plate, and upon the plate rests a flanged ring 36, that is screwed to the lower end of the vessel 22, the parts being securely bolted together, as shown in Fig. 1.

37 indicates still another vessel, which is similar in all respects to the vessel 12, it being provided with a divided dome 38, similar to the dome 15, the division-wall in the dome 38 being indicated by 39. The top plate over this vessel is indicated by 40, and the ring at the upper end that corresponds to the ring 16 is indicated by 41. At its lower end the vessel 37 is provided with a ring 42, that rests upon the base-plate 10, as does the ring 13 of the vessel 12. 43 indicates a settling-chamber, similar in every respect to the settling-chamber 20 and secured by bolts in the same manner that said settling-chamber 20 is secured.

44 indicates a series of tubes secured in openings in the upper plate 40 and the base-plate 10 and corresponding to the series of tubes 18 in the vessel 12. 45 indicates another series of tubes similarly secured, but arranged so as to communicate with the dome 38 at the opposite side of the division-wall 39 from that at which the tubes 44 communicate.

46 indicates a pipe communicating at one end with the interior of the vessel 22, near the lower end of such vessel, and at its upper end communicating with the interior of the dome 38, the point of entrance to such dome being at that side of the division-wall 39 that will allow water passing into the dome from the pipe 46 to pass down only through the tubes 44.

47 indicates a pipe through which matter from the settling-chambers 20, 34, and 43 can be drawn, each of such settling-chambers having communication with such pipe through short pipes 48, 49, and 50, respectively, each of said last-named pipes being provided with a suitable cock, as shown.

51 indicates a pipe that communicates with the interior of the vessel 22 by means of a suitable connection in the central upper portion of the dome 25, said pipe 51 being provided with a cock of ordinary construction, as shown. This pipe 51 is for the purpose of permitting the blowing off of any oil that may pass into the apparatus with the water, the oil being separated from the water by the action of the separator 27 and rising to the top of the water in the dome 25.

52 indicates a pipe through which live steam enters the vessel 37 and passes freely around and between the two sets of tubes 44 and 45 in such vessel.

53 indicates another section of pipe connecting the interiors of the vessels 37 and 12, so that the steam may also pass into the vessel 12 and circulate freely around and between the two series of tubes 18 and 19 in such vessel 12, the steam being permitted to escape from such vessel 12 through a pipe 54.

It will therefore be seen that the water as it passes down tubes 18 and up tubes 19 in the vessel 12 and down tubes 44 and up tubes 45 in the vessel 37 is necessarily heated to a very considerable degree; but as no steam whatever enters the intermediate vessel 22 the water as it passes therethrough is not subjected to any heating, but, on the contrary, has opportunity to materially cool and does cool while in such vessel.

55 indicates a pipe communicating with that portion of the interior of the dome 38 above the tubes 45, through which pipe 55 the purified water may pass from the apparatus to the boiler.

In operation the feed-water is admitted through the pipe 31 and passes down, as before stated, through the series of tubes 18 in the vessel 12, passing out of such pipes into the settling-chamber 20, from whence it is forced up through the series of tubes 19 into the opposite side of the dome 15 from that at which it enters, passing from thence through the pipe 26, from which it is discharged directly upon the rapidly-rotating separator 27, the water being by such separator violently agitated and thrown by centrifugal force against the wall of the vessel 22. Passing downward, such water is forced out through the pipe 46 and enters the upper part of the dome 38 over the vessel 37, from which it passes through the series of tubes 44 into the settling-chamber 43, and thence up through the series of tubes 45 and out through the discharge-pipe 55 to the boiler. The water as it passes through the two series of tubes in each of the vessels 12 and 37 is highly heated by the action of the live steam that is constantly fed into the vessels by the means heretofore described; but as no heating of the water is effected while in the intermediate vessel 22 the temperature of the water while in such intermediate vessel 22 is considerably diminished. The effect, as I have found by practical experience, of this manner of treating the feed-water is to separate from the water to a very large extent the particles that would otherwise tend to incrust the boiler and its tubes with scale and disposit such matter in the settling-chambers 20, 34, and 43, the largest amount of such matter being deposited in the chamber 34 immediately after the water has been acted upon in the manner described by the separator 27.

I have shown and described an ordinary water-motor for driving the separator 27; but it is evident that other driving means than that shown and described could be effectively employed. In actual operation I have found the best results to be derived from giving such separator a speed of from fifteen hundred to two thousand revolutions per minute.

All of the settling-chambers are connected in the construction shown to a common pipe, and any one or all may be put in communication with such pipe at any time that it is desired to blow off the accumulation of sediment in the chambers.

I have shown the three vessels arranged closely together on a common base and at equal distances from each other, and this is the construction I prefer, as it renders the apparatus as a whole very compact; but it is evident that the said vessels might be otherwise arranged, if deem desirable, to suit special locations; but however located with reference to each other the arrangement must be such that the feed-water will first pass through one of the heated vessels, then through the cooling vessel or vessel that is unprovided with any heating apparatus, and then through the last heating apparatus. Passing the water through the second heating apparatus not only will cause a separation from the water of such scale or sediment as may not have been deposited in the chamber 34, but will cause the water to be heated to a comparatively high temperature for ejection into the boiler.

That which I claim as my invention, and desire to secure by Letters Patent, is—

1. In a feed-water purifier, the combination with a vessel, and means for supplying water thereto, of a rotating spherical body therein, means for driving said body, and means for conducting water from said vessel, substantially as described.

2. In a feed-water purifier, the combination with a vessel, and means for supplying water thereto, of a rotating spherical body therein provided with projections on its surface, means for driving said body, and means for conducting water from said vessel, substantially as described.

3. In a feed-water purifier, the combination with a vessel, of a body arranged therein and rotating on a horizontal axis, means for rotating said body, and means for conducting water from said vessel, substantially as described.

4. In a feed-water purifier, the combination with a vessel, through which water is adapted to be conducted, of means for heating the water while passing through such vessel, a second vessel, a pipe connecting said two vessels, a rotatable body arranged upon a horizontal axis in said second vessel, means for rotating said body, and a pipe for conducting water from said second vessel, substantially as described.

5. In a feed-water purifier, the combination with a vessel through which water is adapted to be conducted, of means for heating the water while passing through such vessel, a second vessel, a pipe connecting said two vessels, a rotatable spherical body in said second vessel, said body having its surface provided with teeth or projections, means for rotating said body, and a pipe for conducting water from said second vessel, substantially as described.

6. In a feed-water purifier, the combination with a vessel through which water is adapted to be conducted, of means for heating the water while passing through such vessel, a second vessel, a rotatable body arranged upon a horizontal axis in such second vessel, a pipe for conducting water from the first-named vessel to the second-named vessel, said pipe being arranged to discharge the water upon said rotatable body, and a pipe for conducting the water out of said second vessel, substantially as described.

7. In a feed-water purifier, the combination with a vessel through which water is adapted to be conducted, of means for heating the water while passing through the vessel, a second vessel, a rotatable body in such second vessel, a pipe for conducting water from the first-named vessel to the second-named vessel, and a settling-chamber below said second-named vessel, substantially as described.

8. In a feed-water purifier, the combination with a vessel, of a series of water-conducting tubes therein, means for admitting water through such tubes, means for admitting steam to such vessel around said tubes, a second vessel, means for conducting the water from the tubes in said first-named vessel to the interior of said second-named vessel, a rotatable body in said second-named vessel adapted to act upon the water, and a settling-chamber connected with said second-named vessel, substantially as described.

9. In a feed-water purifier, the combination with a vessel, of two series of tubes therein, means for directing water down one of said series of tubes and up in the other of said series, means for admitting steam to such vessel around both of said series of tubes, a second vessel, means for conducting the water after passing through both series of tubes to said second vessel, a rotatable body in said second vessel adapted to act upon the water, and a settling-chamber connected with said second vessel, substantially as described.

10. In a feed-water purifier, the combination with a vessel, of a dome thereupon, a division-wall in said dome dividing the dome into two compartments, a plate between said dome and vessel, two series of tubes in said vessel, one of said series communicating through said plate with one of the compartments of the dome and the other series in like manner communicating with the other compartment of the dome, a water-supply pipe communicating with one compartment of the dome and a discharge-pipe communicating with the other compartment, a bottom plate for the vessel, a chamber below said bottom plate with which said tubes communicate through suitable openings in the bottom plate, means for admitting steam around said two series of tubes, a second vessel with which said discharge-pipe communicates, a rotatable body therein, and a settling-chamber connected with said second vessel, substantially as described.

11. In a feed-water purifier, the combination with a vessel, of a dome thereupon, a division-wall in said dome dividing the dome into two compartments, a plate between said dome and vessel, two series of tubes in said vessel, one of said series communicating through said plate with one of the compartments of the dome and the other series in like manner communicating with the other compartment of the dome, a water-supply pipe communicating with one compartment of the dome, and a discharge-pipe communicating with the other compartment, a bottom plate for the vessel, a chamber below said bottom plate with which said tubes communicate through suitable openings in the bottom plate, means for admitting steam around said two series of tubes, a second vessel with which said discharge-pipe communicates, a rotatable body therein, a settling-chamber connected with said second vessel, a third vessel similar to said first-named vessel, a pipe for conducting water from said second-named vessel to the tubes in said third vessel, and means for admitting steam around the tubes in said third vessel, substantially as described.

12. In a feed-water purifier, the combination with a vessel, of a dome thereupon, a division-wall in said dome dividing the dome into two compartments, a plate between said dome and vessel, two series of tubes in said vessel, one of said series communicating through said plate with one of the compartments of the dome and the other series in like manner communicating with the other compartment of the dome, a water-supply pipe communicating with one compartment of the dome and a discharge-pipe communicating with the other compartment, a bottom plate for the vessel, a chamber below said bottom plate with which said tubes communicate through suitable openings in the bottom plate, a second vessel with which said discharge-pipe communicates, a rotatable body therein, a settling-chamber connected with said second vessel, a third vessel similar to said first-named vessel, a pipe for conducting water from said second vessel to the tubes in said third vessel, means for supplying steam to either the first or third named vessels, and a steam connection between said two last-named vessels, substantially as described.

13. In a feed-water purifier, the combination with a vessel, of a dome thereupon, a division-wall in said dome dividing the dome into two compartments, a plate between said dome and vessel, two series of tubes in said vessel, one of said series communicating through said plate with one of the compartments of the dome and the other series in like manner communicating with the other compartment of the dome, a water-supply pipe communicating with one compartment of the dome and a discharge-pipe communicating with the other compartment, a bottom plate for the vessel, a chamber below said bottom plate with which said tubes communicate through suitable openings in the bottom plate, means for admitting steam around said two series of tubes, a second vessel with which said discharge-pipe communicates, a rotatable body therein, a settling-chamber connected with said second vessel, a third vessel, a pipe for conducting water from said second vessel to said third vessel, means for heating the water in said third vessel, and a water-discharge pipe connected with said third vessel, substantially as described.

14. In a feed-water purifier, the combination with a vessel through which water is adapted to be conducted, of means for heating the water while passing through such vessel, a second vessel, a pipe connecting said first and second vessels, a rotatable body in said second vessel, a settling-chamber connected with said second vessel, a third vessel, means for conducting water from said second vessel to said third vessel, means for again heating the water while in the third vessel, and a pipe for conducting water from said third vessel, substantially as described.

15. In a feed-water purifier, the combination with a vessel through which water is adapted to be conducted, of means for heating the water while passing through such vessel, a second vessel, a pipe connecting said first and second vessels, a rotatable body in said second vessel, a third vessel, means for conducting the water from said second vessel to said third vessel, means for again heating the water while in the said third vessel, a pipe for conducting the water from said third vessel, and a settling-chamber connected with each of said vessels, substantially as described.

16. In a feed-water purifier, the combination with a vessel, and means for supplying water thereto, of a rotating body therein, means for driving said body, and an outlet at the upper end of said vessel, through which oil rising to the surface of the water may be drawn off, substantially as described.

17. In a feed-water purifier, the combination with a vessel, of a rotating body therein, means for driving said body, a dome over said vessel, a water-inlet adapted to deliver water against said rotating body, and an outlet in said dome through which oil rising to the surface of the water may be drawn off, substantially as described.

18. In a feed-water purifier, the combination with a vessel, of a body arranged therein and rotating on a horizontal axis, said body slightly less than the diameter of the said vessel, means for driving said body, and means for conducting water from said vessel, substantially as described.

19. In a feed-water purifier, the combination with a vessel, and means for supplying water thereto, of a body arranged therein and rotating on a horizontal axis and provided with projections on its surface, said body slightly less than the interior diameter of the said vessel, means for driving said body, and means for conducting water from said vessel.

20. In a feed-water purifier, the combination with a vessel, and means for supplying water thereto, of a spherical body arranged therein and rotating on a horizontal axis, said body slightly less than the interior diameter of the said vessel, means for driving said body, and means for conducting water from said vessel, substantially as described.

EDWARD P. CALDWELL.

Witnesses:
ALBERT H. ADAMS,
HELEN M. COLLIN.